United States Patent [19]

Radici et al.

[11] 3,998,791

[45] Dec. 21, 1976

[54] PROCESS FOR THE STABILIZATION OF POLYACETAL REINS

[75] Inventors: Pierino Radici, Turate (Como); Sergio Custro, Goria Maggiore (Varese); Paolo Colombo, Saronno (Varese), all of Italy

[73] Assignee: Societa'Italiana Resine S.I.R. S.p.A., Milan, Italy

[22] Filed: Aug. 19, 1975

[21] Appl. No.: 605,949

Related U.S. Application Data

[63] Continuation of Ser. No. 480,068, June 17, 1974, abandoned.

[30] Foreign Application Priority Data

June 15, 1973 Italy .................................. 25408/73

[52] U.S. Cl. ........................... 260/67 R; 260/67 FP
[51] Int. Cl.$^2$ ..................... C08G 2/34; C08G 2/32
[58] Field of Search ...................... 260/67 FP, 67 R

[56] References Cited

UNITED STATES PATENTS

| | | | |
|---|---|---|---|
| 3,161,616 | 12/1964 | Brown et al. | 260/67 FP |
| 3,207,727 | 9/1965 | Matsubayashi et al. | 260/67 FP |
| 3,236,810 | 2/1966 | Leverett et al. | 260/67 FP |
| 3,393,179 | 7/1968 | Leverett | 260/67 FP |
| 3,875,117 | 4/1975 | Ackermann et al. | 260/67 R |

*Primary Examiner*—Lucille M. Phynes
*Attorney, Agent, or Firm*—Sughrue, Rothwell, Mion, Zinn & Macpeak

[57] ABSTRACT

Process for the stabilization of polyacetal resins having terminal hydroxyl groups, which comprises reacting a reagent capable of etherifying the hydroxyl groups with the polyacetal resins suspended in a reaction medium that is liquid under the conditions used, the said reaction medium consisting of at least one substance that is a solvent for the polymer and at least one substance that is a non-solvent for the polymer, the said solvent and non-solvent substances being completely miscible at the reaction temperatures but immiscible or partly miscible at temperature substantially lower than the reaction temperatures, and carrying out the operation in the presence of catalytic quantities of one or more compounds selected from the groups consisting of a. strong or medium-strong mineral acids whose acid dissociation constant or first acid dissociation constant is higher than $10^{-7}$;
b. strong or medium-strong oganic acids whose acid dissociation constant is higher than $10^{-6}$;
c. alkyl, cycloalkyl, or alkylaromatic esters of strong or medium-strong mineral acids;
d. alkyl, cycloalkyl or alkylaromatic esters of strong or medium-strong organic acids.

16 Claims, No Drawings

PROCESS FOR THE STABILIZATION OF POLYACETAL REINS

This application is a continuation of the now abandoned U.S. Pat. application Ser. No. 480,068, filed June 17, 1974.

BACKGROUND OF THE INVENTION

1. Field of the Invention

The present invention relates to a process for the stabilization of polyacetal resins, and in particular to the conversion of the hydroxyl end groups of the macromolecules into ether groups.

2. Description of the Prior Art

The polyacetal resins of the present application are polymers having a molecular weight of at least 10,000 which have been prepared by homopolymerisation of an aldehyde, copolymerisation of various aldehydes or copolymerisation of one or more aldehydes with other non-aldehydic monomers. Specific examples of polyacetal resins are the polyacetal resins obtained from formaldehyde and the cyclic oligomers of the formaldehyde, such as trioxane and tetraoxone, or from 5,6-dihydro-1,2-pyran-3-carboxy aldehyde (dimer of acrolein) by homopolymerization or copolymerisation with non-aldehydic monomers. The copolymers are obtained e.g. by copolymerisation of an aldehyde, such as formaldehyde or a corresponding cyclic oligomer, such as trioxane, with different monomers, e.g. cyclic ethers, such as ethylene oxide, 1,3-dioxolane and epichlorohydrin. The polyacetal resins contain at least one hydroxyl group per macromolecule. The preparation of such polyacetal resins is described e.g. in U.S. Pat. Nos. 2,768,994, 2,828,286, and 2,844,561.

German Offenlegungsschrift No. 2,263,606 describes a process for the stabilization of polyacetal resins containing terminal hydroxyl groups according to which carboxylic anhydrides, isocyanates, isothiocyanates or orthoesters are preferably used for the reaction with the hydroxyl groups.

The conversion of the hydroxyl groups of polyacetal resins into ester groups by reaction with anhydrides of carboxylic acids, and generally with acetic anhydride, is almost exclusively the technique used. The conversion of the hydroxyl groups into ether groups, on the other hand, has not been used in practice, though polyacetal resins with ether end groups have a higher thermal and chemical stability than those with ester end groups. Thus the thermal decomposition of the ester group in an atmosphere of nitrogen generally occurs at about 240°–260° C, whereas that of the ether group occurs at 280°–320° C.

There are other good reasons for preferring the hydroxyl groups of polyacetal resins to be in the etherified form. Thus ester groups are readily hydrolyzed by alkaline agents, whereas ether groups are alkali resistant. The superior resistance of ether groups to thermal and chemical action makes it less problematic to choose the additives and stabilizers (such as phenolic compounds and basic organic compounds containing nitrogen) that are normally added to polyacetal resins.

Moreover, the introduction of simple groups such as methyl and ethyl groups into the end of a macromolecule causes less disturbance of the crystal structure of the polymer than the most common ester group (acetyl). This allows a greater compactness in the structure of the polymer, with a consequent improvement of its general properties such as its physical and physico-mechanical properties.

The reasons why the etherification of polyacetal resins has not been used in practice lie mainly in the difficulties connected with the reagent systems necessary for the attainment of this purpose. The known etherification methods are transetherification, etherification with vinyl compounds, etherification with organic halides, and etherification with cyclic compounds. Transetherification is the only method among those mentioned that has led to partly positive results from the standpoint of the recovery and the thermal and chemical stability of the etherified product. The other methods have not led to acceptable results, especially because of the low activity of the reagents under the etherification conditions. In the transetherification method the hydroxyl end groups of the polyacetal resins are converted into ether groups by reaction with dialkylacetals, ortho ester, ketals, or orthocarbonates in the presence of catalysts, the polymer being kept dissolved or suspended in the reaction medium. The difficulties encountered when one operates in this way are connected above all with the reagent system used. Thus the transetherification reaction is carried out in the presence of cationic catalysts such as boron trifluoride or its complexes, such as boron trifluoride/ether, or the complex salts of fluoboric acid, e.g. p-nitrobenzenediazofluoborate. This procedure leads not only to the blockage reaction of the hydroxyl end groups but also to a transacetalization reaction within the macromolecular chain, with the result that the molecular weight of the polymer decreases in relation to the initial value and some product is lost owing to the more or less pronounced "unravelling" of one of the two polymer chains that are initiated by the attack of the catalyst.

In prior art, efforts were made to limit the transacetalization reaction by variation of the manner in which the etherification was carried out or by choosing polyacetal resins having particular characteristics. For example, polymers with crystallinity values of 100% have been used, and the blockage reaction of the end groups has been carried out both at low and at high temperatures, with the polymer suspended or dissolved in the reaction medium. Totally unsatisfactory results were obtained in every case.

At low temperatures one obtains low reaction rates and low yields of stabilized polymer. At higher temperatures, with the polymer suspended or dissolved, one obtains high reaction rates and acceptable yields of stabilized polymer. However, the molecular weight of the polymer is drastically decreased in relation to the initial value, and the characteristics of the resulting polymer are such as to render it useless for practical purposes.

It is an object of the present invention to provide a process for the stabilization of polyacetal resins containing hydroxyl end groups by etherifying said hydroxyl groups, which allows high reaction rates and practically complete elimination of undesirable molecular weight decreases. The present invention provides a process for the stabilization of polyacetal resins having terminal hydroxyl groups which comprises reacting a reagent capable of etherifying the hydroxyl groups with the polyacetal resins suspended in a reaction medium that is liquid under the conditions used, the said reaction medium consisting of at least one substance that is a solvent for the polymer and at least one substance that is a non-solvent for the polymer, the said solvent and non-solvent substances being completely miscible at the reaction temperatures but immiscible or partly miscible at temperatures substantially lower than the reaction temperatures, and carrying out the operation in the presence of catalytic quantities of one or more compounds selected from the groups consisting of a. strong or medium-strong mineral acids whose acid dissociation constant or first acid dissociation constant is higher than $10^{-7}$;
b. strong or medium-strong organic acids whose acid dissociation constant is higher than $10^{-6}$;
c. alkyl, cycloalkyl, or alkylaromatic esters of strong or medium-strong mineral acids;
d. alkyl, cycloalkyl, or alkylaromatic esters of strong or medium-strong organic acids.

"Reagent" refers to a substance that is capable of converting the unstable hydroxyl groups of acetal polymers into ether groups, the said substance being chosen from the following classes of compounds:

ortho esters, such as orthoformates, orthoacetates, and orthocarbonates of methyl, ethyl, or higher aliphatic alcohols, cycloaliphatic alcohols, or aromatic alcohols;

epoxides, such as ethylene oxide and propylene oxide;

acetals, such as methylal, 1,1-dimethoxyethane, and 1,1-dimethoxydimethyl ether.

Among these reagents orthoformates, such as trimethyl and triethyl orthoformate, orthoacetates, such as trimethylorthoacetate, and dimethoxydimethyl ether are especially preferred. Preferably the reagent is present in the reaction medium in a quantity of from about 0.05 to about 10% by weight.

"Solvent substance" refers to a substance that is liquid under the conditions used, inert towards the other constituents of the reaction mixture, and a solvent for the polyacetal resin under the temperature conditions in which the blockage of the hydroxyl groups of the polymer takes place. This solvent also contains the reagent in the dissolved state. The solvent substances that can be used for the purposes of the present invention belong to the following classes: substituted amides, such as dimethyl formamide and dimethylacetamide; aromatic nitro derivatives, such as nitrobenzene; sulphoxides, such as dimethyl sulphoxide; nitriles, and lactones, such as γ-butyrolactone and ε-caprolactone.

In one embodiment of the process of the present invention, the solvent substance consists of the etherification reagent.

"Non-solvent substance" refers to a substance that is liquid under the conditions used, in which the polyacetal resin in insoluble or substantially insoluble under the conditions in which the transformation of the hydroxyl groups takes place. The said non-solvent substance must be inert towards the solvent substance, the reagent, and the polymer. Among the nonsolvent substances, the following can be used: saturated aliphatic hydrocarbons with straight or branched hydrocarbon chains, cycloaliphatic hydrocarbons, and alkylaromatic hydrocarbons in which the alkyl chain (linear or branches) contains at least 6 carbon atoms.

Among these, linear paraffins having from 6 to 20 carbon atoms per molecule and alkylbenzenes having from 8 to 20 carbon atoms in the alkyl chain are particularly preferred.

Examples of catalysts that can be used in the process of the present invention are:

a. Sulphuric acid, phosphoric acid, and perchloric acid. This class also includes mineral acids that contain their anhydrides, such as fuming sulphuric acid.
b. p-Toluenesulphonic acid, acetic acid, and oxalic acid.
c. Dimethyl and diethyl sulphates and acid dimethyl and diethyl phosphates.
d. Methyl p-toluenesulphonate.

The quantity of catalyst used in the process of the present invention can vary within a wide range of values. In general, the said quantity can vary from about 0.001 to about 2 parts by weight per 100 parts by weight of the liquid reaction medium.

Moreover, according to a fundamental characteristic of the process of the present invention, the solvent substance and the non-solvent substance are completely miscible in the temperature range in which the etherification of the hydroxyl groups of the polyacetal resins takes place, whereas they are immiscible or practically immiscible at temperatures lower than the reaction temperatures, such as ambient temperature (20°–25° C).

More particularly, the reaction temperatures can vary within a range of values from about 50° to about 200° C, though the best results are obtained by operation at about 120° to about 180° C. When the selected temperature is higher than the boiling point of the liquid reaction medium, a pressure above atmospheric is used to prevent the vaporization of liquid substances.

The reaction time has practically no limit other than that required for the completion of the etherification. The times required normally vary from about 1 to about 60 minutes, depending on the temperature and the nature of the selected reaction system; it is preferable in every case to use conditions giving higher reaction rates.

Moreover, the weight ratio between the solvent substance and the non-solvent substance in the reaction system normally varies from about 0.05 : 1 to about 1 : 1.

Finally, the ratio between the polymer and the liquid reaction medium (solvent substance and non-solvent substance) is not critical. However, a characteristic peculiar to the process of the present invention is the ability to use high values of this ratio, and generally values of up to about 1 : 0.5. It is nevertheless possible to use lower values of the said ratio, for example down to about 1 : 10.

When the etherification is carried out in the presence of the catalysts described and within the range of the other conditions of the present invention, one obtains practically quantitative yields of etherified product with practically no change in the molecular weight of the polymer in relation to the initial molecular weight.

In particular, the absence of transacetalization phenomena avoids the breakage of the polymer chains that leads to loss of product and to a decrease in the molecular weight. It is thought that this effect is caused by the catalysts used, whose activity is fully exerted in the particular reaction medium, which, among other things, makes high rates possible for the etherification reaction.

In other words, when the acidic catalysts are used in a traditional reaction medium or in one that is different from that of the present invention, poorer results are obtained with regard to the yield of the etherified product and the molecular weight of the stabilized polymer.

Another advantage of the process of the present invention arises from the immiscibility of the solvent and non-solvent substances at temperatures below the reaction temperature. Thus at the end of the esterification reaction of the unstable hydroxyl groups and after separation of the stabilized polymer, the solvent substance is separated from the non-solvent substance by simple cooling of the mixture. It has been observed experimentally that as a result of this cooling one obtains a phase consisting of the solvent substance containing practically all the impurities and by-products formed during the stabilization reaction. In this way only the solvent substance is subjected to purification before recycling, the non-solvent substance being recycled directly without any prior treatment or only after a mild treatment. This is clearly advantageous when also considering that the non-solvent substance is generally preponderant with respect to the solvent substance in the reaction medium.

The invention is further illustrated by the following nonlimiting examples. The apparatus used in Examples 1 to 9 consists of a steel reactor with a capacity of 5 litres, fitted with an anchor stirrer, a thermometer, and a reflux condenser with a device allowing operation at a controlled pressure, the system being maintained in an atmosphere of nitrogen with a stream of gas passing over the surface. The reactor is also fitted with a jacket for the circulation of oil, connected to a thermostat. A syphon pipe at the bottom of the reactor allows the reaction mixture to be evacuated by the application of a slight excess pressure and to be transferred directly through a pipe to a steel filter with a diameter of 30 cm. The said filter is fitted with a heating jacket, and its filtering sector consists of a steel gauze. The filter is totally enclosed so that an atmosphere of nitrogen can be maintained, and is fitted with a mobile disc, which enables the moist filtered polymer to be squeezed out. The filtrate is collected in a glass flask with a capacituy of 5 litres.

EXAMPLE 1 (Comparison)

After the apparatus described above has been purged with nitrogen, 1620 g of pure, dry dimethylformamide, 180 g of triethyl orthoformate, 5.40 g of fuming sulphuric acid (7% by weight of sulphur trioxide), and finally 150 g of polyoxymethylene glycol are introduced with stirring. The polymer has been obtained by polymerization of pure, monomeric formaldehyde in an inert liquid medium (heptane) with an anionic initiator. The polymer has an inherent viscosity of 1.80, this determination being carried out at 60° C in 0.5% (weight volume) solution in p-chlorophenol to which 2% of α-pinene has been added.

The reaction mixture is heated to 150°–152° C and kept under these conditions for 15 minutes. At this temperature the polymer is dissolved and the solution is fairly viscous and still easy to stir. When the time indicated has elapsed, the cooling phase is started. As cooling progresses the polymer precipitates to give a thick suspension that is very difficult to stir. The suspension is then transferred to the steel filter by means of a slight excess pressure, and the polymer is squeezed out on the filter with the appropriate device. 1310 g of liquid being homogeneous at ambient temperature are recovered in the collecting flask. The polymer is very fine, and is thoroughly washed with toluene containing 1% by weight of triethylamine and then with methanol. The moist powder is dried in an oven at 60° C and at a pressure below atmospheric. 145.5 g of product are recovered in this way.

The following determinations are carried out on the polymer recovered (POM-1):
inherent viscosity: $\eta_e$
apparent density: $\gamma_a$
Thermal degradation at 220° C in an atmosphere of nitrogen: K 220

The latter determination, which is carried out by means of a thermobalance, indicates the decomposition rate in percent by weight of the polymer per minute during the first 30 minutes.

Alkali-stable fraction: ASF

A sample of polymer is heated at a temperature of 150°–152° C for a period of 30 minutes in solution in benzyl alcohol containing 1% by weight of triethanolamine. The weight ratio polymer/benzyl alcohol is kept equal to 1 : 10, while the entire system is maintained in an inert atmosphere by means of nitrogen. After the precipitation of the polymer by cooling the resulting suspension is poured at 50° C into methanol and finally filtered. The recovered product is kept in suspension with boiling methanol for one hour. The suspension is then filtered and the polymer is thoroughly washed with methanol and finally dried in an oven at 60° C and at a pressure below atmospheric. The percentage by weight of polymer remaining is indicated as the alkali-stable fraction ASF.

The following determinations are carried out on this fraction:
inherent viscosity: $\eta_e$ (ASF)
thermal degradation at 220° C in an atmosphere of nitrogen: K 220 (ASF)

The results obtained are shown in Table 1.

EXAMPLE 2 (Comparison)

1125 g of pure, dry dimethylformamide, 180 g of triethyl orthoformate, 3.91 g of fuming sulphuric acid (7% by weight of sulphur trioxide), and finally 450 g of polyoxymethylene glycol are introduced into the reactor. All the components of the system are identical with those used in Example 1. The reaction mixture is heated to 150°–152° C and maintained at this temperature for 15 minutes. The resulting solution of the polymer is very viscous, almost like honey, and stirring is difficult and of reduced efficiency. When the time indicated has elapsed, the cooling phase is started, the precipitation of the polymer being brought about in this way. An unstirrable suspension is obtained, and this is transferred, with great difficulty, to the steel fitter. The polymer remaining in the filter is thoroughly washed with toluene containing 1% by weight of triethylamine and then with methanol. The moist powder is dried in an oven at 60° C and at a pressure below atmospheric, and 424.3 g of product are recovered in this way. The determinations reported in Table 1 are carried out on the polymer (POM-2).

EXAMPLE 3 (Comparison)

1125 g of a mixture of linear $C_{10}$–$C_{14}$ paraffins, 180 g of triethyl orthoformate, 1.30 g of fuming sulphuric acid (7% by weight of sulphur trioxide), and finally 450 g of polyoxymethylene glycol are introduced into the reactor. The components triethyl orthoformate, fuming sulphuric acid, and polymer are identical with those of Example 1. The paraffins have the following composition in percent by weight:
$C_{10} = 12\%$, $C_{11} = 30\%$ $C_{12} = 20\%$, $C_{13} = 15\%$, and $C_{14} = 8\%$.

The reaction mixture is heated to 150°–152° C and maintained at this temperature for 15 minutes. Under the reaction conditions the suspension is very fluid and easy to stir. When the time indicated has elapsed, the cooling phase is started. The suspension is then transferred to the steel filter by means of a slight excess pressure. The filtrate recovered in the collecting flask, in a quantity of 950 g, is homogeneous at ambient temperature. The polymer remaining in the filter is thoroughly washed with toluene containing 1% by weight of triethylamine and then with methanol.

The moist powder is dried in an oven at 60° C, a pressure lower than atmospheric being maintained. 434.2 g of product are recovered in this way.

The determinations reported in Table 1 are carried out on the polymer (POM-3).

EXAMPLE 4

360 g of pure, dry dimethylformamide, 108 g of triethyl orthoformate, 765 g of normal paraffins identical with those of Example 3, 1.30 g of fuming sulphuric acid (7% by weight of sulphur trioxide), and finally 450 g of polyoxymethylene glycol are introduced into the reactor. The components triethyl formate, fuming sulphuric acid, and polymer are identical with those of Example 1. The reaction mixture is heated to 150°–152° C and maintained at this temperature for 15 minutes. Under these conditions the suspension is very fluid and easy to stir. When the time indicated has elapsed, cooling is started, and the suspension is easily transferred by a slight excess pressure to the steel filter, where it filters rapidly. At room temperature the liquid recovered in the collecting flask (1005 g) separates into two layers, i.e. an upper paraffin layer and a lower layer containing the solvent. The granular polymer is thoroughly washed, first with toluene containing 1% by weight of triethylamine and then with methanol. The moist powder is dried in an oven at 60° C. a pressure below atmospheric being maintained. 446.4 g of product are obtained in this way, and the determination reported in Table 1 under POM-4 are carried out.

Table 1.

|  | POM-1 | POM-2 | POM-3 | POM-4 |
|---|---|---|---|---|
| Yield (% by weight) | 97.0 | 94.3 | 96.5 | 99.2 |
| γα (g/ml) | 0.14 | 0.31 | 0.62 | 0.68 |
| $\eta_r$ | 1.66 | 1.67 | 1.60 | 1.75 |
| K220 | 0.045 | 0.060 | 0.060 | 0.030 |
| ASF (% by weight) | 96.4 | 95.0 | 93.0 | 98.5 |
| $\eta_r$ (ASF) | 1.67 | 1.65 | 1.54 | 1.76 |
| K220 (ASF) | 0.03 | 0.04 | 0.04 | 0.02 |

EXAMPLE 5 (Comparison)

150 g of triethyl orthoformate, 1,350 g of pure, dry N,N-dimethylacetamide, 4.50 of diethyl sulphate, and finally 150 g of polyoxymethylene glycol are introduced into the reactor. The polymer has an inherent viscosity of 1.60 and has been obtained in a similar manner to that described in the first example. The reactor is heated to 150°–153° C by circulation of oil in the jacket. At this temperature are the polymer is dissolved in the reaction medium and the viscous solution is still easy to stir. When 20 minutes have elapsed at the temperature indicated, the cooling phase is started. The polymer gradually precipitates to give a thick suspension that is very difficult to stir. The suspension is transferred by a slight excess pressure to the steel filter, and the polymer is then squeezed out on the filter with the appropriate device. 1,000 g of homogeneous liquid are recovered in the collecting flask. The polymer is very fine and is washed with toluene containing 1% by weight of triethylamine and then with methanol. The moist powder is dried at 60° C in an oven, a pressure below atmospheric being maintained. 145.6 g of product are recovered in this way. The determination reported in Table 2 are carried out on the polymer (POM-5).

EXAMPLE 6

100 g of triethyl orthoformate, 300 g of pure, dry N,N-dimethylacetamide, 950 g of a mixture of linear $C_{10}$–$C_{14}$ paraffins (identical with that of Example 3), 1.35 g of diethyl sulphate, and finally 500 g of polyoxymethylene glycol are introduced into the reactor. The components ortho ester, amide, diethyl sulphate, and polymer are identical with those used in Example 5. The reaction mixture is heated to 150°–152° C and is maintained at this temperature for 20 minutes. Under these conditions the suspension is very fluid and easy to stir. The cooling phase is then started, and the suspension is easily transferred to the steel filter, where it filters very rapidly. At ambient temperature the liquid recovered in the collecting flask (750 g) separates into two layers, the upper layer being paraffin and the lower layer containing the solvent. The granular polymer is thoroughly washed with toluene containing 1% by weight of triethylamine and then with methanol. The moist powder is dried in an oven at 60° C and at a pressure below atmospheric, and 495.5 g of product are recovered. The determinations reported in Table 2 are carried out on the polymer (POM-6).

EXAMPLE 7

50 g of trimethyl orthoformate, 500 g of pure, dry dimethyl sulphoxide, 1000 g of linear dodecylbenzene, 1.20 g of p-toluenesulphonic acid, and finally 500 g of a copolymer obtained from trioxane with 0.8% by weight of ethylene oxide are introduced into the reactor. The polyacetal resin has been obtained by copolymerization with a cationic initiator, and has an inherent viscosity of 1.73, this determination being carried out at 60° C in p-chlorophenol containing 2% of α-pinene. The reaction mixture is heated to 155° C and maintained at this temperature for 5 minutes. Under these conditions the suspension is very fluid and easy to stir. When the time indicated has elapsed, the suspension is cooled and transferred by a slight excess pressure to the steel filter. The filtration is extremely rapid. At ambient temperature the liquid recovered in the collecting flask separates into two layers, i.e. an upper hydrocarbon layer and a lower layer containing the solvent. The polymer in the filter is thoroughly washed with toluene containing 1% by weight of triethylamine and then with methanol. Drying is carried out in an oven at 60° C and at a pressure below atmospheric. 494 g of product are recovered in this way. The determinations reported in Table 2 are carried out on the polymer (POM-7).

EXAMPLE 8

100 g of trimethyl orthoacetate, 700 g of pure ε-caprolactone, 700 g of n-dodecane, 4.0 g of 99% phosphoric acid, and finally 450 g of polyoxymethylene glycol are introduced into the reactor. The polymer is identical with that of Example 7. The reaction mixture is heated to 150° C and is kept at this temperature for 10 minutes. Under these conditions the suspension is very fluid and easy to stir. The mixture is then cooled and transferred by a slight excess pressure to the steel filter. The filtration is very fast, and the polymer is squeezed out on the filter. At ambient temperature the filtrate separates into two layers, the upper layer being paraffin and the lower layer containing the solvent. The granular powder is thoroughly washed with toluene containing 1% by weight of triethylamine and then with methanol. Drying is carried out in an oven at 60° C and at a pressure below atmospheric, and 442.3 g of product are recovered. The determinations reported in Table 2 are carried out on the polymer (POM-8).

EXAMPLE 9

800 g of pure, dry dimethyl sulphoxide, 800 g of n-dodecane, 160 g of dimethoxydimethyl ether, 5.50 g of trichloroacetic acid, and finally 400 g of polymer identical with that of Example 7 are introduced into the reactor. The reaction mixture is heated to a temperature of 150°–152° C and maintained at this temperature for 20 minutes. Under these conditions the suspension is very fluid and easy to stir. Cooling is then started, and the mixture is then rapidly transferred to the steel filter. The filtration is very fast, and the filtered polymer is squeezed out. At ambient temperature the filtrate separates into two layers, the upper layer being paraffin and the lower layer containing the solvent. The polymer powder is thoroughly washed with toluene containing 1% by weight of trimethylamine and then with methanol. The moist product is dried in an oven at 60° C and at a pressure below atmospheric, and 340 g of product are recovered. The determinations reported in Table 2 are carried out on the polymer (POM-9).

Table 2

|  | POM-5 | POM-6 | POM-7 | POM-8 | POM-9 |
|---|---|---|---|---|---|
| Yield (% by weight) | 97.1 | 99.1 | 98.8 | 98.4 | 85 |
| $\gamma\alpha$ (g/ml) | 0.16 | 0.66 | 0.67 | 0.68 | 0.67 |
| $\eta_r$ | 1.58 | 1.60 | 1.68 | 1.65 | 1.75 |
| K220 | 0.05 | 0.04 | 0.04 | 0.04 | 0.05 |
| ASF (% by weight) | 94.5 | 97.6 | 97.8 | 98.2 | 90.2 |
| $\eta_r$ (ASF) | 1.48 | 1.61 | 1.69 | 1.67 | 1.79 |
| K220 (ASF) | 0.03 | 0.02 | 0.02 | 0.02 | 0.02 |

What we claim is:

1. In a process for the stabilizatin of polyacetal resins of a molecular weight above 10,000, having terminal hydroxyl groups, which comprises reacting a reagent capable of etherifying the hydroxyl groups with the polyacetal resins suspended in a reaction medium that is liquid under the conditions used, the said reaction medium consisting of at least one substance that is a solvent for the polymer and at least one substance that is a non-solvent for the polymer, the said solvent and non-solvent substances being completely miscible at the reaction temperatures but immisciible or only partly miscible at temperatures substantially lower than the reaction temperatures, the improvement being that the carrying out of the operation is in the presence of catalytic quantities of one or more compounds selected from the groups consisting of a. strong or medium-strong mineral acids whose acid dissociation constant or first acid dissociation constant is higher than $10^{-7}$ and b. strong or medium-strong organic acids whose acid dissociation constant is higher than $10^{-6}$.

2. Process according to claim 1, wherein the reagents capable of etherifying the hydroxyl groups of the acetal polymers are selected from the groups consisting of ortho esters, epoxides, and acetals.

3. Process according to claim 1, wherein the reagent is used in quantities of from about 0.05 to about 10% by weight on the reaction medium.

4. Process according to claim 1, wherein the solvent substances are selected from the group consisting of substituted amides, aromatic nitro derivatives, sulphoxides, nitriles, and lactones.

5. Process according to claim 1, wherein the non-solvent substances are selected from the group consisting of saturated aliphatic hydrocarbons, cycloaliphatic hydrocarbons, and alkylaromatic hydrocarbons.

6. Process according to claim 1, wherein a mineral acid selected from the group consisting of sulphuric acid, phosphoric acid, perchloric acid, and fuming sulphuric acid is used as catalyst.

7. Process according to claim 1, wherein an organic acid selected from the group consisting of p-toluenesulphonic acid, acetic acid, and oxalic acid is used as catalyst.

8. Process according to claim 1, wherein an ester selected from the group consisting of dimethyl and diethyl sulphates, acid dimethyl and diethyl phosphates, and methyl p-toluene-sulphonate is also used as catalyst.

9. Process according to claim 1, wherein the catalyst is used in quantities of from about 0.001 to about 2 parts by weight per 100 parts by weight of liquid reaction medium.

10. Process according to claim 1, wherein the etherification is acrried out at temperatures of from about 50 to about 200° C, with a weight ratio of from about 0.05 : 1 to about 1 : 1 between the solvent substance and the non-solvent substance, and with a ratio of from about 1 : 0.5 to about 1 : 10 between the polymer and the liquid reaction medium.

11. The process according to claim 2, wherein said reagent is triethyl-ortho-formate.

12. The process according to claim 2, wherein said reagent is 1,1-dimethoxydimethyl ether.

13. The process according to claim 2, wherein said reagent is selected from the group consisting of trimethyl-ortho-formate, trimethyl-ortho-acetate, ethylene oxide, propylene oxide, methylal and -1,1-dimethoxyethane.

14. The process according to claim 4, wherein said solvent substances are selected from the group consisting of dimethyl formamide, dimethyl acetamide, nitro benzene, dimethyl sulfoxide, $\gamma$-butyrolactone and $\epsilon$-caprolactone.

15. The process according to claim 1, wherein said solvent substance consists of the etherification reagent.

16. The process according to claim 5, wherein said non-solvent substances are selected from the group consisting of linear paraffins having from 6 to 20 carbon atoms per molecule and alkyl benzenes having 8 to 20 carbon atoms in the alkyl chain.

* * * * *